United States Patent [19]

Mao

[11] Patent Number: 4,745,025
[45] Date of Patent: May 17, 1988

[54] NONWOVEN PRODUCTS BONDED WITH BINDER EMULSIONS OF VINYL ACETATE/ETHYLENE COPOLYMERS HAVING IMPROVED SOLVENT RESISTANCE

[75] Inventor: Chung-Ling Mao, Emmaus, Pa.

[73] Assignee: Air Products and Chemicals, Inc., Allentown, Pa.

[21] Appl. No.: 82,892

[22] Filed: Aug. 6, 1987

Related U.S. Application Data

[62] Division of Ser. No. 831,015, Feb. 19, 1986, Pat. No. 4,698,384.

[51] Int. Cl.$^4$ ............................................. D04H 1/58
[52] U.S. Cl. ..................................... 428/288; 428/290
[58] Field of Search ................................ 428/288, 290

[56] References Cited

U.S. PATENT DOCUMENTS

| | | | |
|---|---|---|---|
| 3,081,197 | 3/1963 | Adelman | 117/140 |
| 3,137,589 | 6/1964 | Reinhard et al. | 117/140 |
| 3,345,318 | 10/1967 | Lindemann | 524/820 |
| 3,380,851 | 4/1968 | Lindemann et al. | 117/140 |
| 3,553,116 | 1/1971 | Kaplan | 524/458 |
| 3,594,336 | 7/1971 | Bergmeister | 524/458 |
| 3,679,620 | 7/1972 | Beresniewicz | 524/820 |
| 3,714,099 | 1/1973 | Biale | 524/820 |
| 3,773,699 | 11/1973 | Bergmeister | 524/458 |
| 3,817,896 | 6/1974 | Bergmeister | 524/820 |
| 3,856,733 | 12/1974 | Sturt et al. | 524/458 |
| 4,001,158 | 1/1977 | Lindemann | 524/820 |
| 4,035,329 | 7/1977 | Wiest et al. | 524/819 |
| 4,073,779 | 2/1978 | West et al. | 524/820 |
| 4,118,356 | 10/1978 | Derona et al. | 524/458 |
| 4,164,489 | 8/1979 | Daniels et al. | 524/819 |
| 4,244,845 | 1/1981 | Woo | 524/458 |
| 4,263,193 | 4/1981 | Sakimoto et al. | 524/458 |
| 4,267,090 | 5/1981 | Heimberg et al. | 524/458 |
| 4,331,577 | 5/1982 | Hanna | 524/819 |
| 4,439,574 | 3/1984 | Schuppiser | 524/458 |
| 4,448,908 | 5/1984 | Pauly et al. | 523/201 |
| 4,449,978 | 5/1984 | Iacoviello | 604/372 |
| 4,481,250 | 11/1984 | Cook et al. | 428/290 |
| 4,563,431 | 1/1986 | Pauly et al. | 436/533 |
| 4,568,706 | 2/1986 | Noetzel | 521/149 |

*Primary Examiner*—James J. Bell
*Attorney, Agent, or Firm*—Michael Leach; James C. Simmons; William F. Marsh

[57] ABSTRACT

A copolymer emulsion for bonding nonwoven products comprising an aqueous medium having colloidally dispersed therein a copolymer consisting essentially of vinyl acetate, 5-35 wt % ethylene and 2 to 10 wt % of an amide functional crosslinking comonomer which is N-methylolacrylamide or a compound of the formula R—NH—(CH$_2$)$_n$—CH(OR')$_2$ where R is (meth)acryloyl, R' is a C$_1$-C$_4$ alkyl group and n is 3 or 4, the copolymer emulsion prepared in the presence of 0.1 to 1 wt % polyvinyl pyrrolidone, based on vinyl acetate in the copolymer. Such emulsion binder copolymers demonstrate improved solvent resistance.

20 Claims, No Drawings

NONWOVEN PRODUCTS BONDED WITH BINDER EMULSIONS OF VINYL ACETATE/ETHYLENE COPOLYMERS HAVING IMPROVED SOLVENT RESISTANCE

This is a division of application Ser. No. 831,015, filed Feb. 19, 1986, now U.S. Pat. No. 4,698,384.

TECHNICAL FIELD

The invention relates to binder compositions for nonwoven products comprising copolymerized vinyl acetate, ethylene and a crosslinking monomer.

BACKGROUND OF THE INVENTION

Nonwoven products comprise loosely assembled webs or masses of fibers bound together with an adhesive binder. Adequately bonded nonwoven fabrics have advantages over woven fabrics for a large variety of uses. It is known to form bonded nonwoven fabrics by impregnating, printing or otherwise depositing an adhesive bonding composition on a base web of fibers. These fibers may be of cellulosic or polymeric materials such as wood pulp, polyesters, polyamides, polyacrylates and the like. The base web of nonwoven fibers, to which the binder is applied, can be produced by carding, garnetting, air laying, wet laying, paper making procedures, or other known operations.

The polymeric binder must imbue the bonded nonwoven product with acceptable dry and wet tensile strength and solvent resistance for the intended application.

One of the more successful copolymer binder compositions for nonwoven products comprises a vinyl acetate/ethylene/N-methylolacrylamide copolymer. (See U.S. Pat. No. 3,380,851).

U.S. Pat. No. 4,449,978 discloses nonwoven products bonded with a binder comprising an interpolymer of vinyl acetate/ethylene/N-methylolacrylamide/acrylamide. These nonwoven products have a low residual free formaldehyde content and good tensile properties.

U.S. Pat. No. 4,481,250 discloses an emulsion binder composition for nonwoven products having good wet tensile strength and low heat seal temperature which comprises an aqueous dispersion of a mixture consisting essentially of 50–95 wt% of a vinyl acetate/ethylene copolymer and 5–50 wt% of a vinyl acetate/ethylene/N-methylolacrylamide copolymer.

U.S. Pat. No. 3,081,197 discloses a nonwoven binder comprising interpolymers of vinyl acetate, another polymerizable compound as an internal plasticizer, and a post-curable comonomer such as N-methylolacrylamide.

U.S. Pat. No. 3,137,589 discloses binders comprising a copolymer of an alpha,beta-unsaturated carboxylic acid amide substituted on the nitrogen by at least one methylol group and another unsaturated polymerizable compound.

SUMMARY OF THE INVENTION

The present invention provides an aqueous colloidal dispersion of vinyl acetate/ethylene copolymers which is useful as a nonwoven binder. The aqueous dispersion, or emulsion, comprises a copolymer consisting essentially of vinyl acetate, 5–35 wt% ethylene and 2 to 10 wt% of an amide functional crosslinking monomer which is N-methylolacrylamide or a comonomer of Formula I

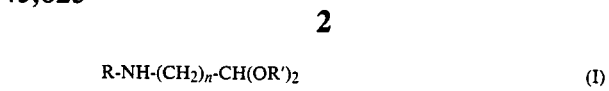

where R is acryloyl or methacryloyl, R' is a $C_1$–$C_4$ alkyl, and n is 3 or 4, the aqueous emulsion containing 0.1 to 1 wt% polyvinyl pyrrolidone, based on vinyl acetate in the polymer, during the polymerization.

The copolymer emulsions of the invention can be applied to a nonwoven web of fibers at a binder add-on sufficient to bond the fibers together to form a self-sustaining web, or nonwoven product. The copolymer binders according to the invention demonstrate a surprising improvement in solvent resistance.

DETAILED DESCRIPTION OF THE INVENTION

There is provided a nonwoven binder emulsion of about 35–65 wt% solids comprising an aqueous medium having colloidally dispersed therein a copolymer consisting essentially of vinyl acetate, 5–35 wt% ethylene and 2 to 10 wt% of an amide functional crosslinking comonomer which is N-methylolacrylamide (NMA) or a comonomer of Formula I

where R is (meth)acryloyl, R' is a $C_1$–$C_4$ alkyl group such as methyl, ethyl, propyl or butyl, and n is 3 or 4, the emulsion containing 0.1 to 1 wt% of polyvinyl pyrrolidone (PVP), based on vinyl acetate in the copolymer. The PVP may be present as a component of the stabilizing system in the polymerization recipe or may be added separately in addition to the stabilizing system, provided the vinyl acetate/ethylene binder copolymer emulsions are prepared by the copolymerization of the monomers in the presence of the PVP.

The preferred copolymers consist essentially of vinyl acetate and 5 to 35 wt% ethylene, especially 10 to 20 wt%, with preferably 3 to 7 wt% of the amide functional crosslinking comonomer. Such copolymer emulsions which are useful as nonwoven binders would have Brookfield viscosities ranging from 100 to 5000 cps, preferably 300 to 2000 cps. The copolymers would have a $T_g$ between $-30°$ and $20°$ C., preferably $-5°$ to $5°$ C.

The vinyl acetate/ethylene copolymers may optionally include one or more additional ethylenically unsaturated copolymerizable monomers. Exemplary of such comonomers, which may be present at up to 10 wt%, are $C_3$–$C_{10}$ alkenoic and alkenedioic acids, such as acrylic acid, methacrylic acid, crotonic acid, isocrotonic acid, maleic acid, fumaric acid and itaconic acid and their monoesters and diesters with $C_1$–$C_{18}$ alkanols, such as methanol, ethanol, propanol, butanol and 2-ethyl hexanol; carboxyethyl acrylate; vinyl halides such as vinyl chloride; and nitrogen-containing monoolefinically unsaturated monomers, particularly nitriles, amides, and allylcarbamates, such as acrylonitrile, acrylamide, methacrylamide, N-methylol allylcarbamate. If such additional ethylenically unsaturated comonomer is used, about 2–5 wt% is preferred.

Contemplated as the functional, or operative, equivalent of vinyl acetate in the copolymer emulsions are vinyl esters of $C_1$–$C_{18}$ alkanoic acids, such as vinyl formate, vinyl proprionate, vinyl laurate and the like.

Contemplated as the functional, or operative, equivalent of NMA in the copolymer emulsions, are the other well known crosslinking monoolefinically unsaturated monomers N-methylolmethacrylamide and the lower alkyl ethers of N-methylol(meth)acrylamide such as isobutoxymethacrylamide and the like.

Copending application Ser. No. 06/714,661 filed Mar. 21, 1985, entitled "Self- and Diol Reactive Formaldehyde-Free Crosslinking Monomers and Their Derived Polymers" and assigned to the assignee of this application discloses the preparation of amide functional crosslinking comonomers of Formula I and their polymerization, which application is incorporated by reference. Representative of such suitable comonomers are methacrylamidopentanal dimethyl acetal, acrylamidopentanal diethyl acetal, methacrylamidobutyraldehyde dimethyl acetal, acrylamidobutyraldehyde dibutyl acetal and the dimethyl and diethyl acetals of acrylamidobutyraldehyde which are the preferred comonomers.

Contemplated as the functional, or operative, equivalents of the comonomers of Formula I are the other crosslinking comonomers and their cyclic hemiamidals disclosed in application Ser. No. 06/714,661.

The polyvinyl pyrrolidone that is used in the vinyl acetate/ethylene copolymer emulsion is characterized by a molecular weight ranging from about 10,000 to 500,000 (preferably 40,000 to 360,000) and may compose a part or all of, or be in addition to, the stabilizing system in the polymerization reaction medium at levels from 0.1 to 1 wt%, preferably 0.2 to 0.7 wt%, and especially 0.25 to 0.5 wt%, based on vinyl acetate monomer. Above about 1 wt% PVP the emulsion becomes very viscous and unsuitable for commercial use.

Vinyl acetate and ethylene are copolymerized in the presence of PVP and a stabilizing system comprising a protective colloid and/or surfactants in an aqueous medium under pressures not exceeding about 100 atm and in the presence of a free radical source which is added incrementally, the aqueous system being maintained by a suitable buffering agent at a pH of about 2-6. The process involves first a homogenization in which the vinyl acetate suspended in water is thoroughly agitated in the presence of ethylene under the working pressure to effect solution of the ethylene in the vinyl acetate while the reaction medium is gradually heated to polymerization temperature. The homogenization period is followed by a polymerization period during which the free radical source (and an optional reductant) is added incrementally.

The amide functional crosslinking comonomer may be added all at once with the vinyl acetate and ethylene or incrementally over the course of the polymerization reaction.

Various free-radical generating materials can be used in carrying out the polymerization of the monomers, such as peroxide compounds. Combination systems employing both reducing agents and oxidizing agents can also be used, i.e. a redox system. The reducing agent is often referred to as an activator and the oxidizing agent as an initiator. Suitable reducing agents include bisulfites, sulfoxylates, or alkali metal bisulfite-ketone adducts, or other compounds having reducing properties such as ascorbic acid, erythorbic acid and other reducing sugars. The oxidizing agents include hydrogen peroxide, organic peroxides such as t-butyl hydroperoxide and the like, persulfates, such as ammonium or potassium persulfate and the like. Specific redox systems which can be used include hydrogen peroxide and zinc formaldehyde sulfoxylate; hydrogen peroxide and erythorbic acid; hydrogen peroxide, ammonium persulfate or potassium persulfate with sodium metabisulfite, sodium bisulfite, ferrous sulfate, zinc formaldehyde sulfoxylate or sodium formaldehyde sulfoxylate; and t-butyl hydroperoxide with sodium bisulfite-acetone adduct. Other free radical forming systems that are well known in the art can also be used to polymerize the monomers. The oxidizing agent is generally employed in an amount of 0.01 to 1%, preferably 0.05 to 0.5% based on the weight of the vinyl acetate introduced into the polymerization system. The reducing agent is ordinarily added in the necessary equivalent amount.

The emulsifying agents composing the stabilizing system which can be used in the polymerization recipe include ionic and nonionic surfactants, preferably the nonionic types which are well known to those skilled in the polymerizaton art. Suitable nonionic emulsifying agents include polyoxyethylene condensates. Other emulsifying agents include protective colloids, such as polyvinyl alcohol and the cellulose materials such as methyl cellulose, hydroxyethyl cellulose, hydroxypropylmethyl cellulose and the like. As stated previously, PVP which is a necessary ingredient of the invention, may form part of the stabilizing system.

The concentration range of the total amount of the emulsifying agents useful is from 0.5–10%, preferably 4–5%, based on total emulsion.

Vinyl acetate/ethylene copolymer emulsions of relatively high solids content can be directly produced, e.g. 40–60% solids.

The reaction temperature can be controlled by the rate of free radical addition and by the rate of heat dissipation. Generally, it is advantageous to maintain a mean temperature of about 50° C. during the polymerization of the monomers and to avoid temperatures much in excess of 80° C. Although temperatures as low as 0° C. can be used, economically the lower temperature limit is about 30° C.

The reaction time will depend upon variables such as the temperature, the free radical forming source and the desired extent of polymerization. It is generally desirable to continue with the reaction until less than 0.5% of the vinyl acetate remains unreacted.

In carrying out the polymerization, an amount of vinyl acetate is initially charged to the polymerization vessel and saturated with ethylene. Most advantageously, at least about 10% of the total vinyl acetate to be polymerized is initially charged, preferably at least about 20%, and the remainder of the vinyl acetate is added incrementally during the course of the polymerization. The charging of all the vinyl acetate initially is also contemplated with no additional incremental supply.

When reference is made to incremental addition, whether of vinyl acetate, amide functional crosslinking comonomer, or free radical source, substantially uniform additions, both with respect to quantity and time, and intermittent additions are contemplated. Such additions are also referred to as "delay" additions.

The quantity of ethylene entering into the copolymer is influenced by the pressure, the agitation and the viscosity of the polymerization medium. Thus, to increase the ethylene content of the copolymer, higher pressures, greater agitation and a low viscosity are employed.

The process of forming the vinyl acetate/ethylene copolymer emulsion generally comprises preparation of an aqueous solution containing at least some of the stabilizing system and the pH buffering system. This aqueous solution and the initial charge of vinyl acetate are added to the polymerization vessel and ethylene pressure is applied to the desired value. As previously mentioned, the mixture is thoroughly agitated to dissolve ethylene in the vinyl acetate and in the water phase. Conveniently, the charge is brought to polymerization reaction temperature during this agitation. The polymerization is then initiated by introducing initial amounts of the oxidant, the reductant having been added with the initial charge. After the polymerization has started, the oxidizing agent and reducing agent are incrementally added as required to continue polymerization. The amide functional crosslinking comonomer and the remaining vinyl acetate, if any, may be added as separate delays.

As mentioned, the reaction is generally continued until the residual vinyl acetate content is below about 0.5%. The completed reaction product is then allowed to cool to about room temperature while sealed to the atmosphere.

The vinyl acetate-ethylene copolymer binders of the invention can be used to prepare nonwoven products, or fabrics, by a variety of methods known in the art which, in general, involve the impregnation of a loosely assembled mass of fibers with the binder emulsion, followed by a moderate heating to dry the mass. In the case of the present invention, this moderate heating also serves to cure the binder by forming a crosslinked interpolymer. Before the binder is applied, it is, of course, mixed with a suitable catalyst for the crosslinking monomer. For example, an acid catalyst such as mineral acids, e.g. hydrogen chloride, or organic acids, e.g. oxalic acid, or acid salts such as ammonium chloride, are suitably used as known in the art. The amount of catalyst is generally from 0.5 to 2% of the total polymer.

The starting fiber layer or mass can be formed by any one of the conventional techniques for depositing or arranging fibers in a web or layer. These techniques include carding, garnetting, air-laying, wet laying and the like. Individual webs or thin layers formed by one or more of these techniques can also be laminated to provide a thicker layer for conversion into a fabric. Typically, the fibers extend in a plurality of diverse directions in general alignment with the major plane of the fabric, overlapping, intersecting and supporting one another to form an open, porous structure.

When reference is made to "cellulose" fibers, those fibers containing predominantly $C_6H_{10}O_5$ groupings are meant. Thus, examples of the fibers to be used in the starting layer are the natural cellulose fibers such as wood pulp, cotton and hemp and the synthetic cellulose fibers such as rayon, and regenerated cellulose fibers. Often the fiber starting layer contains at least 50% cellulose fibers, whether they be natural or synthetic, or a combination thereof. Often the fibers in the starting layer may comprise natural fiber such as wool, jute; artificial fibers such as cellulose acetate; synthetic fibers such as polyamides, nylon, polyesters, acrylics, polyolefins, i.e. polyethylene, polyvinyl chloride, polyurethane, and the like, alone or in combination with one another.

The fibrous starting layer is subjected to at least one of several types of bonding operations to anchor the individual fibers together to form a self-sustaining web. Some of the better known methods of bonding are overall impregnation or printing the web with intermittent or continuous straight or wavy lines for areas of binder extending generally transversely or diagonally across the web and additionally, if desired, along the web.

The amount of copolymer binder, calculated on a dry basis, applied to the fibrous starting web is that amount which is at least sufficient to bind the fibers together to form a self-sustaining web and suitably ranges from about 3 to about 100% or more by weight of the starting web, preferably from about 10 to about 50 wt% of the starting web. The impregnated web is then dried and cured. Thus the nonwoven products are suitably dried by passing them through an air oven or the like and then through a curing oven. Typical conditions to achieve optimal cross-linking are sufficient time and temperature such as drying at 150°–200° F. (66°–93° C.) for 4–6 minutes, followed by curing at 300°–310° F. (149°–154° C.) for 3–5 minutes or more. However, other time-temperature relationships can be employed as is well known in the art. Shorter times and higher temperature or longer times at lower temperature is being used.

EXAMPLE 1

Synthesis of Acrylamidobutyraldehyde Diethyl Acetal (ABDA).

4-Aminobutyraldehyde diethyl acetal (AmBDA, 75 g, 1.09 mol, Aldrich Chemical) was combined with a two phase mixture of 955 mL of $CH_2Cl_2$ and 160 mL of 14N NaOH in a 3 neck flask equipped with a thermometer and an efficient mechanical stirrer. This was cooled to 15° C. with an ice bath. Acryloyl chloride (98.3 g, 1.09 mol, Aldrich) was added via an addition funnel at a rate slow enough to maintain the reaction temperature below 30° C. Reaction monitoring by capillary glpc revealed essentially complete AmBDA consumption when the acryloyl chloride addition was complete. Agitation was continued for 1 h. The layers were separated (water may be added to dissolve precipitated salt and improve phase separation) and the organic phase was washed with saturated brine. The brine was combined with the aqueous layer and back extracted with $CH_2Cl_2$. The combined organic layers were neutralized with saturated aqueous $NaH_2PO_4$, dried over anhydrous $MgCl_2$ and concentrated on a rotary evaporator at 40° C. to give 99% pure ABDA (by glpc) in 87% yield. The product can be freed of any high molecular weight by-products by kugelrohr distillation (120°–125° C. at 0.2 torr), but this produces significant yield losses and partial isomerization to N-acryloyl-5-ethoxy pyrrolidine (AEP) and related products. The pot temperature should not exceed 60° C. during these operations. The yield loses are minimized by adding a basic reagent, such as $Na_2CO_3$, and a radical inhibitor, such as methylene blue, to the distillation vessel.

EXAMPLE 2

To prepare a vinyl acetate/ethylene/NMA copolymer emulsion according to the invention the following ingredients are added to a jacketed vessel: 950 parts water, 296 parts vinyl acetate, 140 parts 28% aqueous Polystep B-27 surfactant, 10 parts of 45% aqueous PVP K-60, 0.1 parts ferrous sulfate, 2 parts sodium formaldehyde sulfoxylate dissolved in 14 parts water and 1 part of sodium acetate. The reaction medium is adjusted to a pH of 4.3 with acetic acid. The vessel is heated to 50° C. with stirring at 900 rpm and purged with nitrogen. Once the system is purged, Feed 1 consisting of 1189 g vinyl acetate is added continuously over a four hour period. Mixing speed is increased with the addition of ethylene to a pressure of 625 atm. Feed 2 consists of 14.7 parts t-butyl hydroperoxide T-BHP (70%) mixed with 327 parts water. Feed 3 consists of a solution of 23.7 parts SFS dissolved in 91 parts of water. Feed 4 is a solution of 323 parts of NMA (48% concentration) and 207 parts water. At initiation, Feeds 2 and 3 are added continuously over a six hour period while Feed 4 is added continuously over a 5.5 hour period.

The reaction product on completion is cooled to 35° C. and then transferred to a degassing unit to which is added 2.5 parts Colloid 585 defoamer in 2.3 parts of water, 0.9 parts sodium formaldehyde sulfoxylate (SFS) in 9.0 parts of water and 2.5 parts $H_2O_2$ (35%) with 13.3 parts of water.

Runs 1-6 and A were prepared substantially following the above procedure. In control Run A, instead of the PVP there was added deionized water.

TABLE A

| | VAE-NMA COPOLYMERS | | | |
|---|---|---|---|---|
| | | TENSILES (pli) | | |
| RUN | % PVP | DRY | WET | MEK |
| A | 0 | 16.0 | 7.9 | 8.3 |
| 1 | 0.1 | 16.5 | 8.2 | 9.1 |
| 2 | 0.2 | 16.2 | 8.0 | 9.3 |
| 3 | 0.3 | 16.5 | 8.5 | 10.2 |
| 4 | 0.45 | 16.1 | 8.1 | 9.4 |
| 5 | 0.75 | 16.0 | 8.0 | 8.7 |
| 6 | 1.0 | 16.2 | 8.1 | 8.7 |

EXAMPLE 3

A vinyl acetate/ethylene/acrylamidobutyraldehyde diethyl acetal (ABDA) copolymer emulsion containing polyvinyl pyrrolidone (Run 7) was prepared according to the following procedure:

A 1 gallon reactor was charged with 1142.7 g of a 2% aqueous solution of Natrosol 250LR hydroxyethyl cellulose, 136.9 g vinyl acetate, 19.1 g Igepal C0887 surfactant, 13.3 g Igepal C0630 surfactant, 13.3 g Pluronic F-68 surfactant, 13.3 g Pluronic L-64 surfactant, 20 g PVP K-60, 5.5 g sodium acetate, 3.30 g acetic acid, 0.05 g ferric ammonium sulfate and 15.2 g of SAB reducing agent solution (19.8 sodium meta-bisulfite, 11.6 g acetone and 408.0 g deionized water) and purged for 40 minutes with nitrogen. The kettle was heated to 48° C., agitated at 800 RPM, pressurized with ethylene to 450 lbs. and initiated by adding a 3% aqueous solution of t-butylhydroperoxide (TBHP) at 0.6 ml/min. Upon initiation, the rate was switched to automatic and 1228 g vinyl acetate added at 7.3 ml/min. Ten minutes later the SAB solution was added at 0.2 ml/min. The reaction temperature was maintained at 49° C. and the free monomer at 8%. After two hours, 493 g of a 10% aqueous solution of ABDA was added at 4.0 ml/min. The vinyl acetate delay was complete at 3 hours and the ethylene turned off. The ABDA delay was complete at 4 hours whereupon the free monomer was 1.5%. The reaction was cooled, degassed and treated with 5 g of a 10% aqueous solution of TBHP and 4.6 g of a 50% aqueous solution of Colloid 585 defoamer.

Run 8 was identical to Run 7 except that only 10 g PVP was used. Run 9 was the same as Run 7 except 62.7 g deionized water replaced the PVP. Run 10 was the same as Run 7 except 12 g Natrosol 250LR hydroxyethyl cellulose and 12 g PVP K-60 in 1176 g deionized water was used instead of the 2% aqueous hydroxyethyl cellulose solution.

TABLE B

| | VAE-ABDA COPOLYMERS | | | |
|---|---|---|---|---|
| | | TENSILES (pli) | | |
| RUN | % PVP | DRY | WET | MEK |
| 7 | 0.5 | 16.3 | 4.4 | 5.2 |
| 8 | 0.25 | 15.5 | 4.8 | 5.9 |
| 9 | 0 | 15.7 | 6.2 | 4.6 |
| 10 | 0.6 | 16.8 | 6.9 | 5.3 |

It can be seen from the data presented in Tables A and B that the incorporation of a minor amount of a polyvinyl pyrrolidone into the vinyl acetate/ethylene copolymer binder emulsions resulted in an unexpected improvement in their performance in solvent resistance as a nonwoven binder.

STATEMENT OF INDUSTRIAL APPLICATION

The invention provides vinyl acetate/ethylene copolymer emulsions useful as binders for the preparation of nonwoven products.

I claim:

1. A nonwoven product comprising a nonwoven web of fibers bonded together with a vinyl acetate/ethylene copolymer binder deposited from an aqueous medium having colloidally dispersed therein a copolymer consisting essentially of vinyl acetate, 5-35 wt% ethylene and 2-10 wt% of an amide functional crosslinking comonomer which is N-methylolacrylamide or a comonomer of the formula $R\text{-NH-}(CH_2)_n\text{-CH}(OR')_2$ where R is acryloyl or methacryloyl, R' is a $C_1$-$C_4$ alkyl group, and n is 3 or 4, the copolymer prepared by emulsion polymerization in the presence of 0.1 to 1 wt% polyvinyl pyrrolidone, based on vinyl acetate in the copolymer, at a binder add-on sufficient to bond the fibers together to form a self-sustaining web.

2. The nonwoven product of claim 1 in which the ethylene content of the copolymer is 10-20 wt%.

3. The nonwoven product of claim 1 in which the amide functional crosslinking comonomer is 3-7 wt% of the copolymer.

4. The nonwoven product of claim 1 in which the polyvinyl pyrrolidone is 0.2-0.7 wt%.

5. The nonwoven product of claim 1 in which the polyvinyl pyrrolidone is 0.25-0.5 wt%.

6. The nonwoven product of claim 1 in which the amide functional crosslinking comonomer is N-methylolacrylamide.

7. The nonwoven product of claim 1 in which the amide functional crosslinking monomer is a comonomer of the formula $R\text{-NH-}(CH_2)_n\text{-CH}(OR')_2$.

8. The nonwoven product of claim 7 in which R is acryloyl, R' is methyl or ethyl and n is 3.

9. The nonwoven product of claim 1 in which the binder add-on is 3 to 100 wt%, based on web.

10. The nonwoven product of claim 1 in which the binder add-on is 10 to 50 wt%, based on web.

11. A nonwoven product comprising a nonwoven web of fibers bonded together with a vinyl acetate/ethylene copolymer binder deposited from an aqueous medium having colloidally dispersed therein a copolymer consisting essentially of vinyl acetate, 10-20 wt% ethylene and 3-7 wt% of an amide functional crosslinking comonomer which is N-methylolacrylamide or a comonomer of the formula $$\text{R-NH-(CH}_2)_n\text{-CH(OR')}_2$$

where R is acryloyl or methacryloyl, R' is a $C_1$–$C_4$ alkyl group, and n is 3 or 4, the copolymer prepared by the emulsion polymerization in the presence of 0.2 to 0.7 wt% polyvinyl pyrrolidone, based on vinyl acetate in te copolymer, at a binder add-on sufficient to bond the fibers together to form a self-sustaining web.

12. The nonwoven product of claim 11 in which the polyvinyl pyrrolidone is 0.25–0.5 wt%.

13. The nonwoven product of claim 11 in which the amide functional crosslinking monomer is N-methylolacrylamide.

14. The nonwoven product of claim 11 in which the amide functional crosslinking monomer is a comonomer of the formula $\text{R-NH-(CH}_2)_n\text{-CH(OR')}_2$.

15. The nonwoven product of claim 14 in which R is acryloyl, R' is methyl or ethyl and n is 3.

16. The nonwoven product of claim 13 in which the polyvinyl pyrrolidone is 0.25–0.5 wt%.

17. The nonwoven product of claim 13 in which the binder add-on is 3 to 100 wt%, based on web.

18. The nonwoven product of claim 13 in which the binder add-on is 10 to 50 wt%, based on web.

19. The nonwoven product of claim 14 in which the binder add-on is 3 to 100 wt%, based on web.

20. The nonwoven product of claim 14 in which the binder add-on is 10 to 50 wt%, based on web.

* * * * *